(12) United States Patent
Tsao (10) Patent No.: US 6,196,115 B1
(45) Date of Patent: Mar. 6, 2001

(54) STRUCTURE OF A MULTI-FUNCTION COOKING UTENSIL

(76) Inventor: Mindy Tsao, P.O. Box No. 6-57, Chung-Ho City, Taipei Hsein 235 (TW)

( * ) Notice: Subject to any disclaimer, the term of this patent is extended or adjusted under 35 U.S.C. 154(b) by 0 days.

(21) Appl. No.: 09/630,565

(22) Filed: Aug. 3, 2000

(51) Int. Cl.[7] .............. A47J 27/00; A47J 27/04; A47J 36/06; A47J 36/12; A47J 37/00

(52) U.S. Cl. ............... 99/339; 99/340; 99/413; 99/415; 99/417; 99/418; 99/449; 99/450; 126/20; 126/369

(58) Field of Search ............... 99/330, 339, 340, 99/403, 410–418, 444–450, 400, 401; 126/369, 20, 369.1, 390; 219/401; 222/912, 428; 210/464–469, 475, 477; 426/523, 510, 511

(56) References Cited

U.S. PATENT DOCUMENTS

| | | | |
|---|---|---|---|
| 3,908,111 | * | 9/1975 | Du Bois et al. ............ 219/442 |
| 4,148,250 | * | 4/1979 | Miki et al. ............... 99/403 |
| 4,426,923 | * | 1/1984 | Ohata .................... 99/468 |
| 4,672,179 | * | 6/1987 | Onishi et al. ............ 99/403 X |
| 4,739,698 | * | 4/1988 | Allaire .................. 99/410 |
| 4,982,656 | * | 1/1991 | Stone .................... 99/450 X |
| 5,092,229 | * | 3/1992 | Chen ..................... 99/413 X |
| 5,189,947 | * | 3/1993 | Yim ...................... 99/415 |
| 5,216,947 | * | 6/1993 | Cheng .................... 99/448 X |
| 5,400,701 | * | 3/1995 | Sham ..................... 99/410 |
| 5,404,803 | * | 4/1995 | Glucksman ................ 99/473 |
| 5,458,050 | * | 10/1995 | Su ....................... 99/340 |
| 5,584,235 | * | 12/1996 | DuBois et al. ............ 99/413 |

* cited by examiner

*Primary Examiner*—Timothy F. Simone (57) ABSTRACT

A structure of a multi-function cooking utensil simultaneously having the functions of frying, boiling, sauteing, deep-frying, and steaming food is composed of a pot member, a steaming member and a cover member. By means of a design of a fixing bolt on the upper rim of the cover member and the two lateral external sides of the steaming member and the pot member, users can change according to their need the detachable handle, or detachable grip, or detachable handle of the cover in order to lift the cooking utensil. In addition, by means of the design of several grooves of different depths in the internal rim of the lateral side of the steaming member and the pot member, and in compliance with several protruding rafters of a barbeque rack or a steaming tray provides the pot member and the steaming member several layers for cooking. Furthermore, by means of a plurality of steam holes deposed on the internal side of the bottom of the steaming member and a big hollow cavity from by stamping on the proper location, and a movable plate having several protruding rafters. Such arrangement allows the cooking utensil to have the steaming, boiling, deep-frying function. By the foregoing structural design with the mechanical parts, this invention can save energy and reduce the packing space, and further enhance the economic applicability effect.

4 Claims, 7 Drawing Sheets

STRUCTURE OF A MULTI-FUNCTION COOKING UTENSIL

BACKGROUND OF THE INVENTION

1. Field of the Invention

The present invention relates to a structure of a multi-function cooking utensil, particularly to a structure having a pot member, steaming member and covering member allows users to install according to their needs a detachable handle or a detachable grip, or install a barbeque rack or steaming tray in the several grooves of different depths in the internal rim of the lateral side of the steaming member and the pot member respectively, or install a movable plate at the bottom of the internal rim of the steaming member and such arrangement allows the cooking utensil to simultaneously have the functions of frying, boiling, sauteing, deep-frying, and steaming, and to save energy and to reduce the packing space in order to enhance the economic practicability effect.

2. Description of the Prior Art

Conventional cooking utensils commonly used in households are single-functional, for example, the boiling pot, saute pan, frying pan, deep-frying pot, steamer, etc. Both lateral sides of these cooking utensil have handles or grips, or a lifting member on the cover of the pot for the users to lift the pot. The boiling pot and the frying pan are most frequently used in a household, but those other than these two are not used that often. The cost of these cooking utensils is relatively high, and the packing and storage space is extremely large that makes the originally small kitchens more crowded. Therefore, to save money and raise the utility efficiency, the inventor conducted a series of innovative researches with the spirit of striving for perfection and made use of his professionalism and knowledge to design a cooking utensil with minimal number of assembling parts, and by means of careful study he designs a cooking utensil that reduces its storage and packing space. The invention incorporates a design of multi-functional parts and maximizes their efficiencies and provides a more practical multi-function cooking utensil that complies with the safety standards and the industrial values.

This invention is composed of a pot member, a steaming member and a covering member; wherein each of both lateral sides of the external edge of the pot member, both lateral sides of the external edge of the steaming member and the upper edge of the covering member has a fixing bolt bracket for installing a detachable handle, or a detachable grip, or a detachable handle for the covering member in order to facilitate the users to lift the pot. Furthermore, by means of a plurality of grooves having various depths deposed along the internal rim of the lateral sides of the pot member and the internal edge of the lateral sides of the steaming member in compliance with a plurality of the protruding rafters of the barbeque rack or steaming tray provides a plurality layers for cooking. In addition, the internal edge of the bottom of the steaming member has a plurality of steaming holes and a hollow formed by pressing the appropriate position of the steaming member, and a movable plate having a plurality of protruding rafters for holding the movable plate, and gives the overall cooking utensil a concurrent functions of steaming, boiling, or deep frying.

Therefore, in summation of the above description of the structural design of the cooking utensil, the inventor of the present invention based on years of experience in the related industry conducted extensive research to enhance the structure of the cooking utensil herein which is hereby submitted for patent application.

Therefore, the primary objective of the present invention is to provide a cooking utensil having concurrent functions such as frying, boiling, sauteing, deep-frying, and steaming food by a structural design for the pot member and the steaming member.

The secondary objective of the present invention is to save the storage space and to reduce the packaging space and in turn to enhance the economic utility.

To make it easier for our examiner to understand the performance, the structure, and the innovative features of the present invention, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
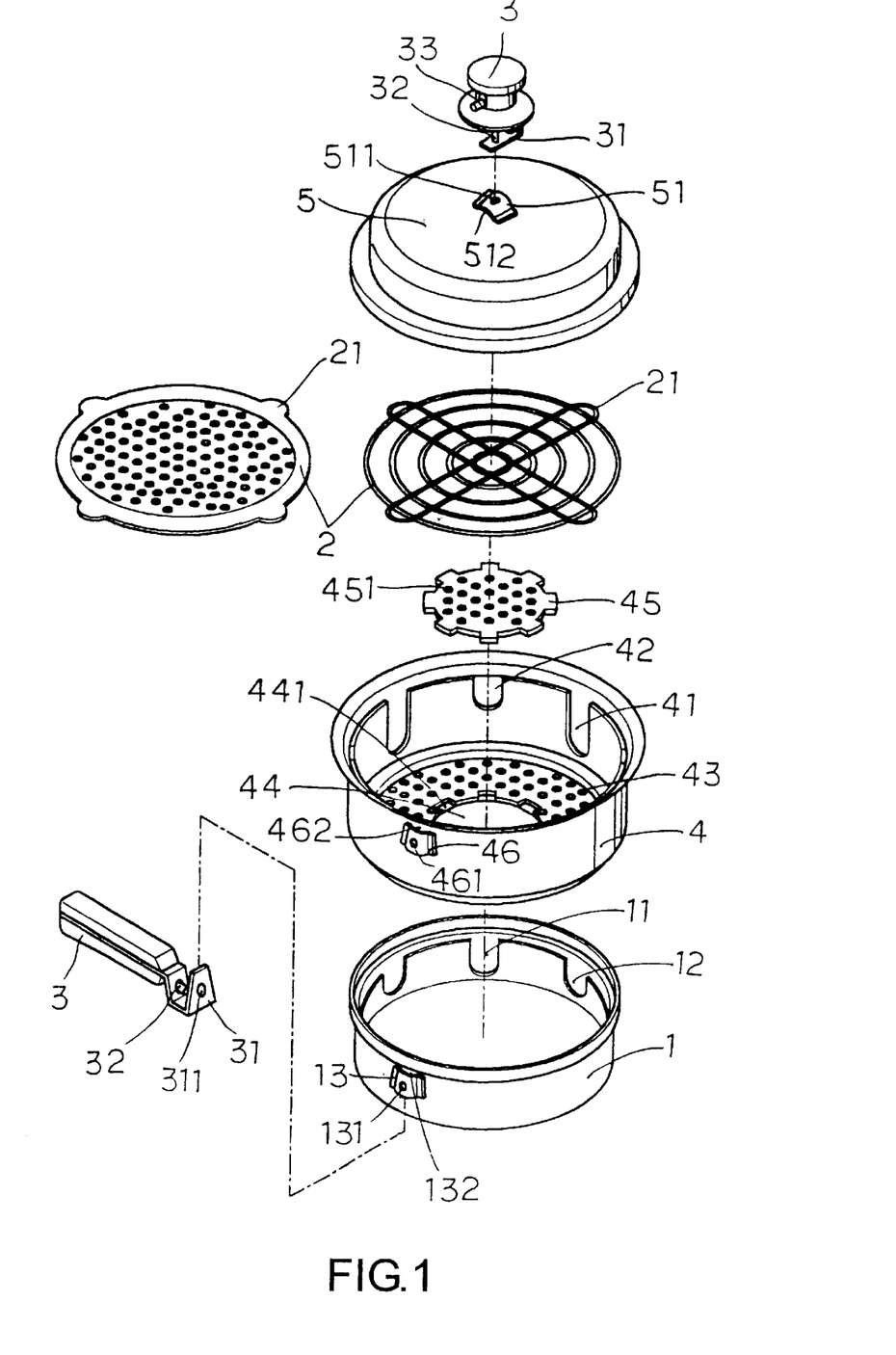
FIG. 1 shows the three-dimensional diagram of the disassembled parts of the present invention.
Figure 2:
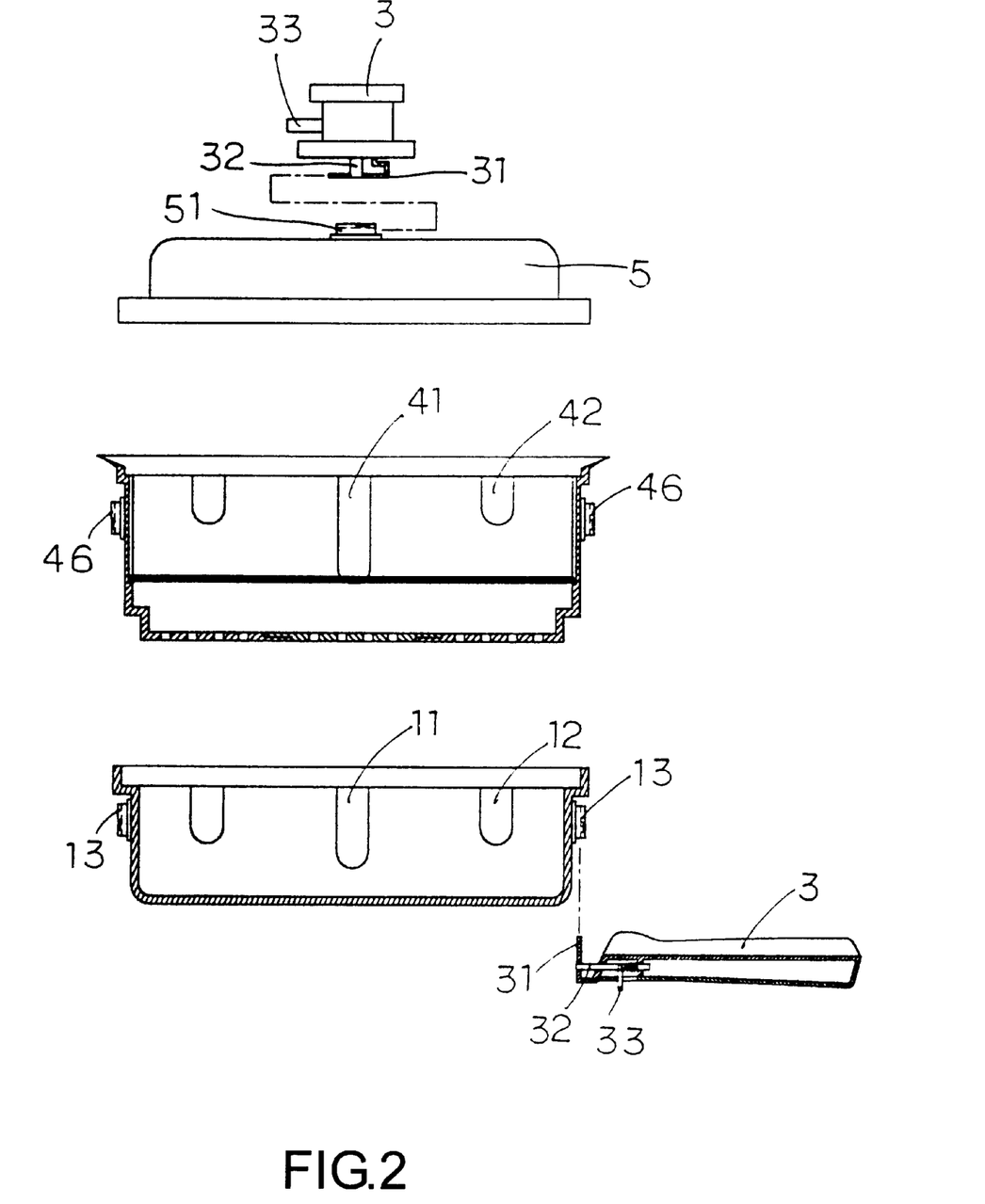
FIG. 2 illustrates the cross-sectional side view of FIG. 1.

FIGS. 1 and 2 are the three-dimensional diagram showing the disassembled parts and the cross-sectional side view of the present invention respectively. The present invention mainly comprises:

a pot member 1 having a plurality of grooves 11, 12 with various depths on the lateral sides of such pot member. Said grooves are for engaging a barbeque rack or a steaming tray 2 having a plurality of protruding rafters 21, and a fixing bolt bracket 13 is deposed at an appropriate position on the external edges along both lateral sides. Said fixing bolt bracket having a hole 131 at an appropriate position is mounted to the external edge of the lateral side of said pot member I to form a hollow 132 for securely installing a handle or a grip 3. An end of said handle or said grip 3 having a U-shaped bolt bracket 31 for inserting into said hollow 132 formed by said fixing bolt bracket 13 and the external edge of the lateral side of said pot member 1. There is a hole 311 at the appropriate position on each of the lateral sides of the U-shaped bolt bracket 31; said hole 311 is corresponsive to the hole 131 of said fixing bolt bracket 13. In compliance with a design of a spring bolt rod 32 and a trigger latch 33 in an end of the handle or the grip 3. After triggering the trigger latch 33 by a finger, the spring bolt rod 32 will be inserted into the holes 311 on both lateral sides of the U-shaped bolt bracket 31 and the holes 131 of the fixing bolt bracket 13. Such arrangement will secure the handle or the grip 3 to the external edge of the lateral sides of the pot member.

A steaming member 4 having its bottom deposed at the groove along the internal rim on the foregoing pot member 1, and the internal rim of its lateral sides has a plurality of grooves with various depths 41, 42 for accommodating the barbeque rack or the steaming tray 2 having a plurality of protruding rafters 21, and the internal rim of the bottom of such steaming member has a plurality of steaming holes 43, and at the appropriate position at the bottom has a hollow 44 formed by pressing the bottom at the appropriate position and a movable plate 45 having a plurality of protruding rafters 451 for accommodating said movable plate 45. There is a hole 461 at the appropriate positions on the fixing bolt bracket 46; and said fixing bolt bracket 46 and the external edge of the lateral sides of said steaming member 4 are connected to form a hollow 462 for securely fixing the handle and the grip 3. There is an U-shaped bolt bracket 31 at an end of said handle or said grip 3 for inserting into the hollow 462 formed by said fixing bolt bracket 46 and the external edge of the lateral sides of said steaming member. There is a hole 311 deposed at the appropriate position of both sides of said U-shaped bolt bracket 31 corresponsive to the hole 461 of the fixing bolt bracket 46, and in compliance with the design of a spring bolt rod 32 and a trigger latch 33 at an end of the handle or the grip 3. After the trigger latch 33 is triggered by user's fingers, the spring bolt rod 32 will be inserted through the hole 311 on both sides of the U-shaped bolt bracket 31 and the hole 461 of the fixing bolt bracket 46, so that the handle or the grip 3 can be secured to the external edge of the lateral sides of the steaming member 4.

A covering member 5 is for covering the groove along the internal rim of the foregoing steaming member 4 or pot member 1, and there is a fixing bolt bracket 51 at the appropriate position on it, and a hole 511 deposed at the appropriate position of the fixing bolt bracket 51; a hollow 512 is formed by connecting said fixing bolt bracket 51 and the upper edge of the covering member 5 for securely accommodating a handle 3. An U-shaped bolt bracket 31 is deposed at an end of said handle 3 for inserting into the hollow 512 formed by connecting fixing bolt bracket 51 and the upper edge of the covering member 5, and a hole 311 is deposed at the appropriate position on each of both sides of the U-shaped bolt bracket corresponsive to the hole 511 of the fixing bolt bracket 51. In compliance with the design of a spring bolt rod 32 and a trigger latch 33 at one end of the handle 3, after the trigger latch is triggered by user's fingers, said spring bolt rod 32 will be inserted through the holes 311 on both sides of the U-shaped bolt bracket 31 and the hole 511 of the bolt fixing bracket 51 for securely fixing the handle 3 to the upper edge of the covering member.

By assembling the foregoing components, the present invention accomplishes the concurrent functions of frying, boiling, sauteing, deep-frying, and steaming food.

Figure 3:
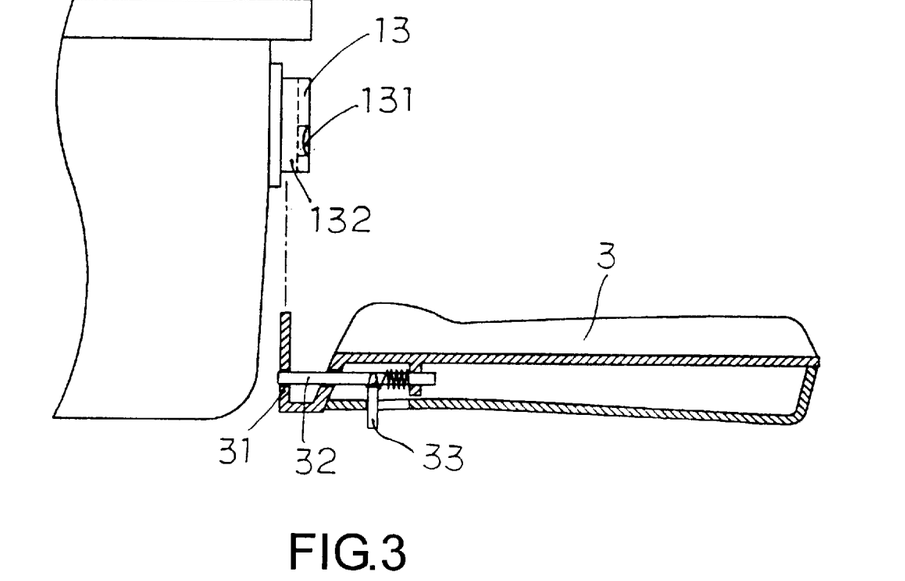
FIG. 3 illustrates the cross-sectional side view of assembling of pot member or steaming member with the handle according to the present invention.

As shown in FIG. 3, when frying or sauteing proceeds, we only need to assemble the pot member 1 and the handle 3. Firstly, the user triggers the trigger latch of the handle 3, and the spring bolt rod 32 will pull backward, and secondly the user insert a lateral side of the U-shaped bolt bracket 31 of the handle 3 towards the hollow opening 132 of the fixing bolt bracket 13 of the pot member 1 from top to bottom, or from left to right, or from right to left or from bottom to top. The hole 311 on both sides of the U-shaped bolt bracket 31 will be corresponsive to the hole 131 of the fixing bolt bracket 13. Then the trigger latch 33 is released and the spring bolt rod 32 will insert into the holes 31 on both sides of the U-shaped bolt bracket 31 and the hole 131 of the fixing bolt bracket 13. The handle 3 will be securely fixed to the external edge of the pot member 1. After finishing with its use and taking out the handle 3, the user triggers the trigger latch 33 of the handle 3 again, the spring bolt rod 32 will withdraw from the holes 311 on both sides of the U-shaped bolt bracket 31 and the hole 131 of the fixing bolt bracket 13. Finally, the user releases the U-shaped bolt bracket 31 of the handle 3 smoothly from the hollow opening 132 of the fixing bolt bracket.

Figure 4:
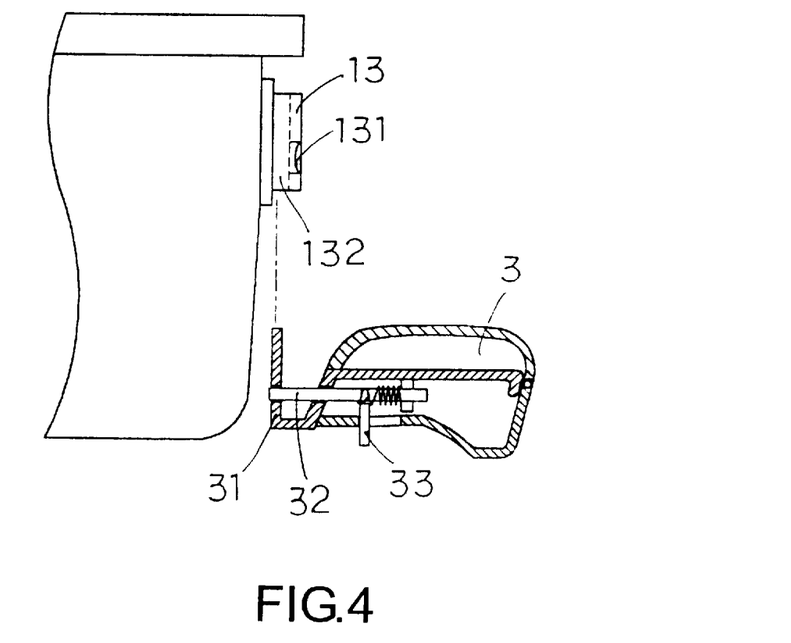
FIG. 4 illustrates the cross-sectional side view of the assembling of pot member or steaming member with the grip according to the present invention.

Furthermore, as shown in FIG. 4, the handle 3 inserted into the hollow 132 of the fixing bolt bracket 13 of the pot member can also be replaced by a grip for such connection. When proceeding with the concurrent functions of boiling, deep-frying, and steaming, it facilitates the lifting of the pot member 1.

Figure 5:
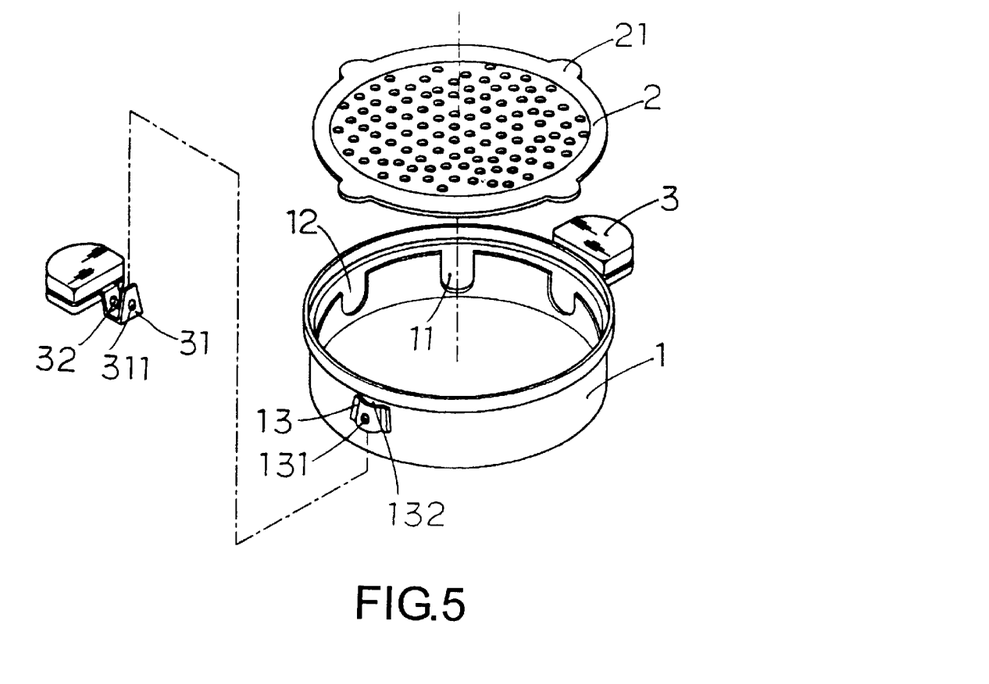
FIG. 5 illustrates the assembly of the pot member and the barbeque rack according to the present invention.
Figure 6:
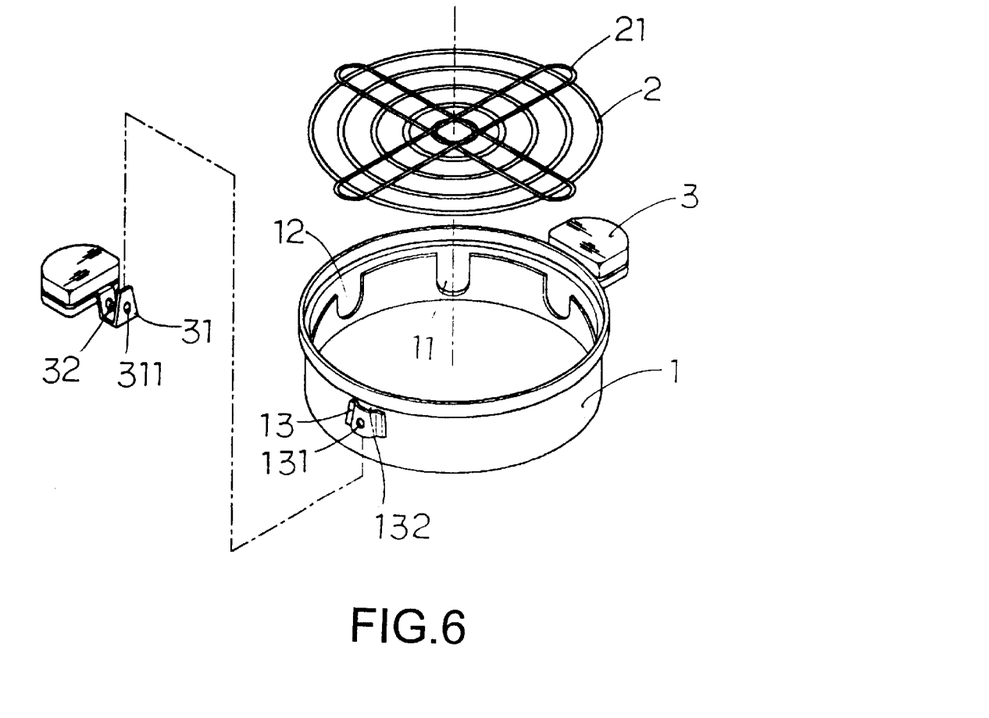
FIG. 6 illustrates the assembly of the pot member and the steaming member according to the present invention.

Refer to FIGS. 5 and 6, when the user cooks food by steaming or boiling, the internal edge of the lateral side of the pot member 1 having 4 grooves (both deep and shadow) 11, 12 for placing a barbeque rack or a steaming tray 2 having 4 corresponding protruding rafters. The four protruding rafters of such barbeque rack or steaming tray can be placed to the shallow groove 12 according to the user's need or to a deep groove 11; for example placing the protruding rafters 21 of the barbeque rack or steaming tray 2 onto the four shallow grooves 12, and then put the food in the barbeque rack or steaming tray 2, and cover with the covering member 5 at the grooves along the rim of the pot member. Such arrangement forms a simple single layer steamer.

The handles or grips 2 securely fixed into the hollow 462 of the fixing bolt bracket 46 of the steaming member 4 according to the present invention as shown in FIGS. 3 and 4 are the same as the handles or grips 3 securely fixed into the hollow 132 of the fixing bolt bracket 13 of the pot member 1. Their assembly procedure is the same, and when serving food from the steaming member 4 or the pot member 1, the users need to hold the handle of grips with both hands to move the steaming member 4 or the pot member 1 in order to prevent damages from the high heat and burning of the hand.

Figure 7:
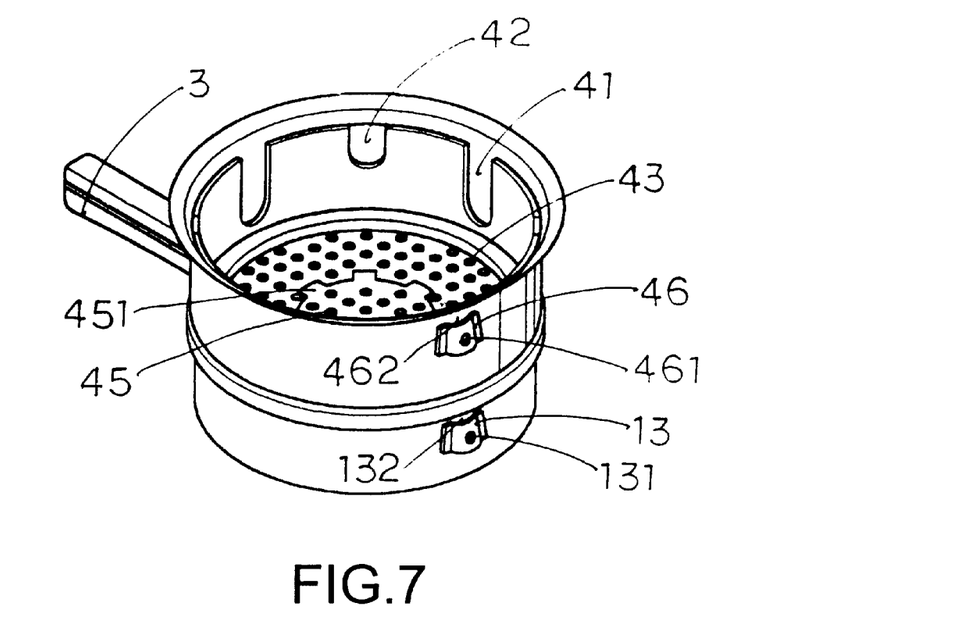
FIG. 7 illustrates the assembly of the steaming member and the movable plate according to the present invention.
Figure 8:
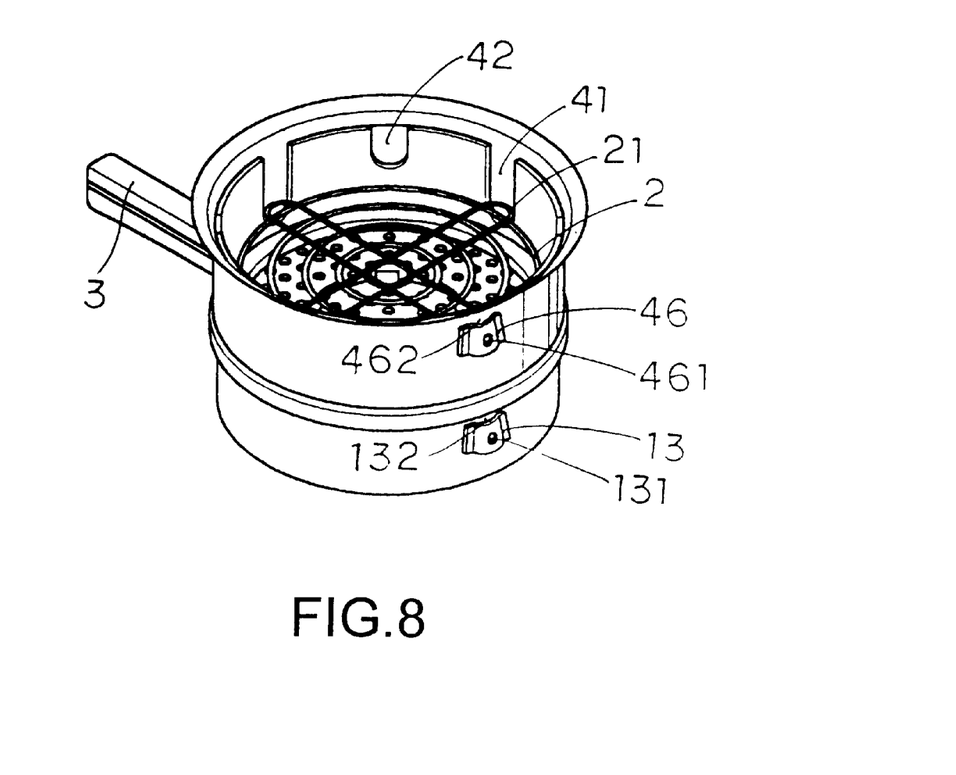
FIG. 8 illustrates the assembly of the steaming member and the barbeque rack according to the present invention.
Figure 9:
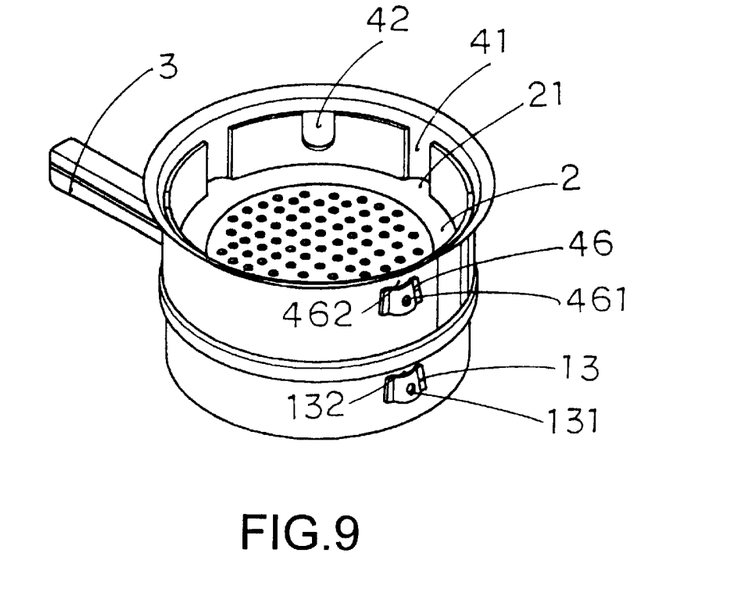
FIG. 9 illustrates the assembly of the steaming member and steaming tray according to the present invention.

Refer FIGS. 7, 8 and 9, by the design of the four deep and shallow grooves 41, 42 along the internal rim on the lateral side of the steaming member 4 and the steaming holes 43 on the internal surface of the bottom of the steaming member, and the hollow 44 formed by pressing at the appropriate position of the steaming member, and a movable plate having 4 protruding rafters 451, this invention provides a multi-layer steamer. Firstly, the steaming member 4 is put into the pot member along the internal rim of the pot member, and then put appropriate amount of water into the pot member, and then insert the four protruding rafters 451 of the movable plate 45 corresponsive to grooves 44 along the periphery of the hollow 44, and then put the four protruding rafters 21 of the at least two barbeque rack or steaming tray 2 respectively onto the deep and shallow grooves 41, 42 of the internal rim of the lateral side of the steaming member, and then put the food on the barbeque rack or steaming member 2, and finally cover the steaming member 4 along the internal grooves with a covering member 5.

Figure 10:
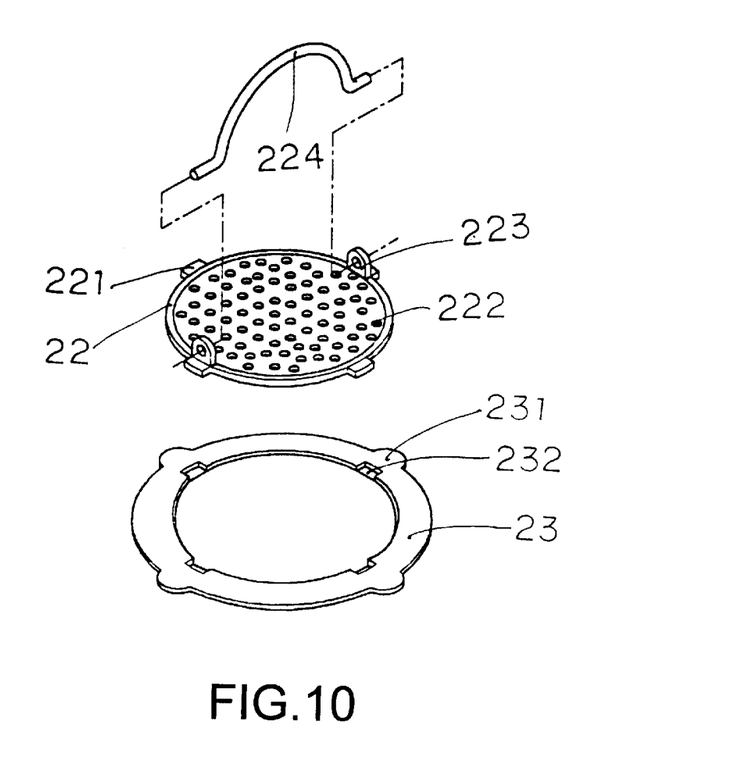
FIG. 10 shows another embodiment of the steaming tray according to the present invention.

As shown in FIG. 10, the steaming tray 2 having four protruding rafters 21 according to this invention can be pressed into two plates namely daughter plate 22 and mother plate 23; said mother plate forms a hollow ring and at its external rim there are several protruding rafters 231 for mounting onto the deep and shallow grooves 11, 12 along the lateral side of the pot member 1 or onto the deep and shallow grooves 41, 42 along the lateral side of the steaming member 4. Said mother plate 23 having a plurality of grooves 232 along its internal rim is securely mounted responsively to the protruding rafters 221 of the daughter plate 22. The daughter plate has a plurality of steam holes 222 or grooves, or crevices for steaming and boiling food. Furthermore, the daughter plate 22 is of the same size of the movable plate 45 at the bottom of the steaming member 4, and there are holes 223 at the proper position on the daughter plate 22 for accommodating the insertion of the handle 224, or directly installed a pair of corresponsive handles 224 at the proper position on the handle 224 in order to facilitate the users to lift the plate 22.

Figure 11:
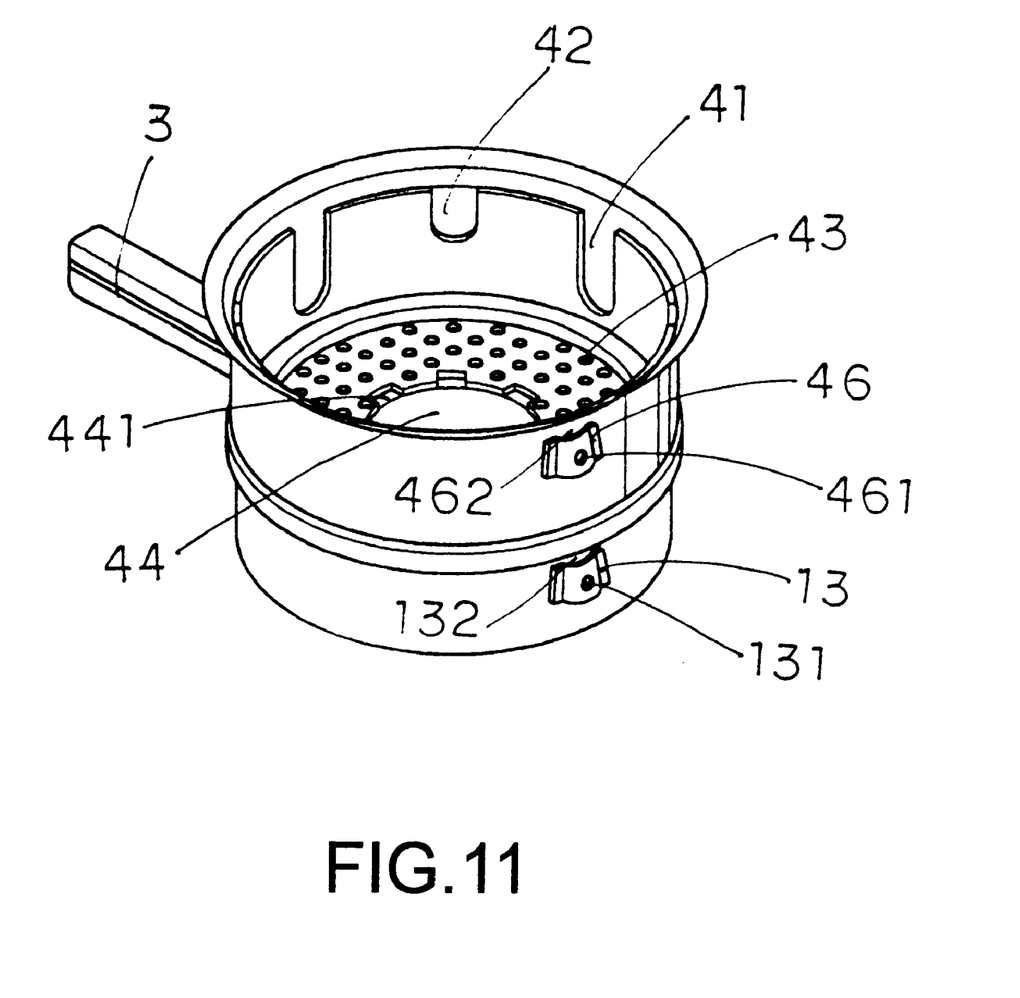
FIG. 11 illustrates the deep-frying according to the present invention.

Please refer to FIG. 11, as we lift the movable plate from the internal side at the bottom of the steaming member 4, and then put suitable amount of oil in the pot member, the present invention by means of the hollow 44 at the appropriate position at the bottom of the steaming member 4 provides a pot for deep-frying food. When we finished with the deep-frying of the food, the cooked food can be placed on the periphery bottom side of the hollow 44 of the steaming member 4 and let the oil drips through a plurality of the steaming holes into the pot member and forms a dripping net along the periphery at the bottom of the steaming member 4. In addition, by making use of the height of the steaming member 4, we can prevent any spill of the hot oil for safety purpose.

When the cooking utensil of the present invention is not in use, the accessories such as the handle or grip 3, barbeque rack or steaming rack 2, and movable plate 45 are all stored into the steaming member 4, and put the pot member 1 into the steaming member 4 with the bottom of the pot member facing the steaming member, and finally put the covering member 5 up side down in the pot member 1. Such arrangement can save the storage space and reduce the packaging.

In summation of the above description, the present invention herein enhance the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A structure of a multi-function cooking utensil, mainly comprising:

a pot member having a plurality of deep and shallow groves along the internal rim of the lateral side of said pot member for accommodating a plurality of protruding rafters of a barbeque rack or a steaming rack, and said pot member also having a fixing bolt bracket deposed at the appropriate position along the external rim of the lateral side of said pot member, and a hole at the appropriate position on said fixing bolt member; said fixing bolt bracket and the lateral side of said pot member forms a hollow cavity for securing said handle or grip;

a steaming member having a bottom deposed in the groove along the internal rim of said pot member, its lateral side having a plurality of deep and shallow grooves for accommodating a plurality of protruding rafters of a barbeque rack or a steaming tray, and its internal rim at the bottom has a plurality of steaming holes, and a hollow is formed by pressing at the appropriate position at the bottom of said steaming member, and a movable plate having a plurality of protruding rafters; said hollow having a plurality of grooves along its periphery rim corresponding to said plurality of protruding rafters of said movable plate and for placing said movable plate; and there is a hole deposed at the proper position on the fixing bolt bracket forming a hollow with the external rim of the lateral side of the steaming member for securely accommodating the handle or the grip; and a covering member for covering said steaming member or pot member along its internal grooves, said covering member has a fixing bolt bracket at the proper position at the upper rim and a hole at the proper position on said fixing bolt bracket, and said fixing bolt bracket and the upper rim of said covering member forms a hollow for inserting the handle.

2. A structure of a multi-function cooking utensil as set forth in claim 1, wherein said steaming tray having a plurality of protruding rafters forms a mother plate and a daughter plate by pressing said steaming tray, said mother plate forms a hollow ring, and its external rim having a plurality of protruding rafters for putting the deep and shallow grooves along the internal rim of said pot member or said steaming member; and said mother plate having a plurality of grooves along the internal rim of said mother plate, and said daughter plate has a plurality of steaming holes or a plurality of grooves or holes.

3. A structure of a multi-function cooking utensil as set forth in claim 2, wherein the size of said daughter plate is the same as that of said movable plate at the bottom of said steaming member, and a corresponsive hole at the proper position on the lateral sides of the daughter plate for the insertion of said handle or directly installed a pair of corresponsive handles at the proper position on the daughter plate.

4. A structure of a multi-function cooking utensil as set forth in claim 1, wherein said handle or an U-shaped bolt bracket at an end of said handle is for inserting into the hollow cavity formed by connecting said fixing bolt bracket and the lateral side of said pot member or the external rim of said steaming member or the upper rim of said covering member; and said U-shaped bolt bracket having a hole on each of its lateral side corresponsive to the holes formed by said fixing bolt bracket complying with a design of a spring bolt rod and a latch of said handle or grip; by releasing said latch and in turn inserting said spring bolt rod into the holes of said U-shaped fixing bolt bracket, said holes of said fixing bolt bracket; such arrangement secures the handle or grip to the lateral external rim of said pot member or the lateral external rim of said steaming member or the upper rim of said covering member.

* * * * *